Figure 1:
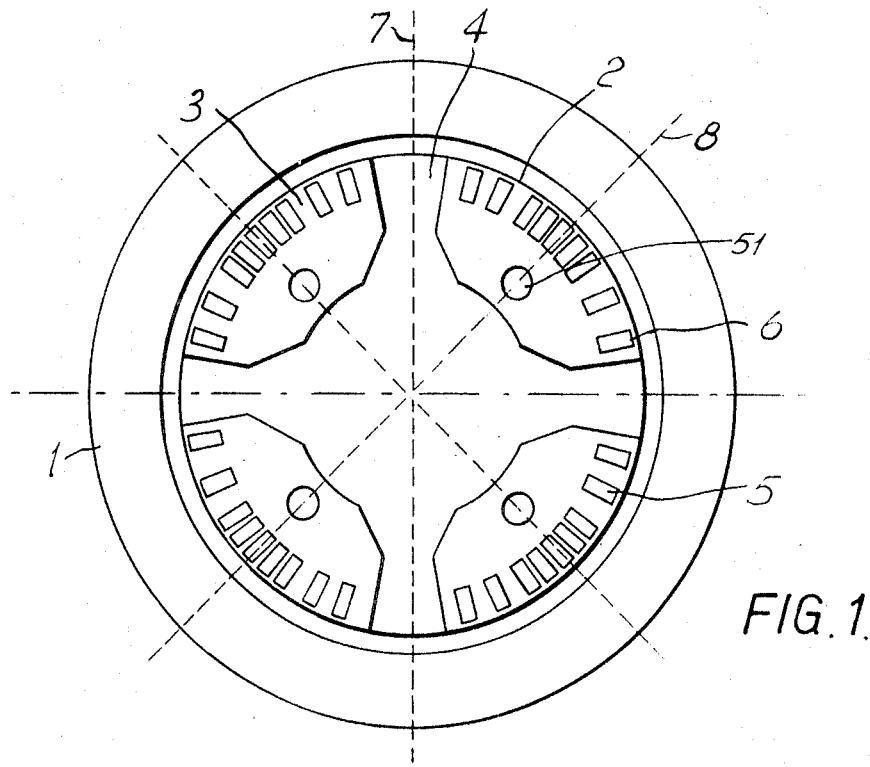

United States Patent

[11] 3,597,646

| [72] | Inventor | Peter John Lawrenson<br>11 Cookridge Ave., Leeds 16, Yorkshire, England |
|---|---|---|
| [21] | Appl. No. | 5,599 |
| [22] | Filed | Jan. 26, 1970 |
| [45] | Patented | Aug. 3, 1971<br>Continuation-in-part of application Ser. No. 633,103, Apr. 27, 1966. |

[54] DYNAMOELECTRIC MACHINES
12 Claims, 8 Drawing Figs.
[52] U.S. Cl. .................................................. 310/166, 310/211, 310/265
[51] Int. Cl. ..................................................... H02k 17/42
[50] Field of Search .......................................... 310/163, 162, 211, 231, 261, 166, 46, 167, 168, 265

[56] References Cited
UNITED STATES PATENTS

| 2,733,362 | 1/1956 | Bauer | 310/261 |
|---|---|---|---|
| 2,939,025 | 5/1960 | Williford | 310/163 |
| 3,154,705 | 10/1964 | Essenburg | 310/211 |
| 3,157,805 | 11/1964 | Hoffmeyer | 310/211 |
| 3,243,620 | 3/1966 | Suhr | 310/166 |
| 3,448,310 | 6/1966 | Lawrenson | 310/166 |
| 3,493,799 | 2/1970 | Lacroux | 310/166 |

Primary Examiner—Milton O. Hirshfield
Assistant Examiner—R. Skudy
Attorney—Cushman, Darby & Cushman ABSTRACT: A reluctance motor has a rotor constructed of separate segments of magnetic material and a squirrel cage winding, the conductor bars of which are arranged so that the cross section of conductive material decreases from a maximum in the central regions of the segments to a minimum in the vicinity of the ends of the segments. For example there may be no bars in the gaps and wider bars or bars spaced more closely together in the central regions. Shallow central channels with at least the vestiges of separate slots may be provided, the slots serving to maintain the value of the direct axis leakage reactance of the rotor winding. Towards the segment ends the slot shapes may be varied to reduce leakage reactance and increase the resistance. In addition, the segments may be provided with tips extending circumferentially outwardly. Also, holes may be provided close to the bases of the winding slots to cause saturation of the magnetic material between the holes and the slots. Yet again flux barriers may be provided beneath the winding slots.

PATENTED AUG 3 1971 3,597,646

SHEET 1 OF 4

INVENTOR
PETER JOHN LAWRENSON

BY Cushman, Darby & Cushman
ATTORNEYS

INVENTOR
PETER JOHN LAWRENSON
BY Cushman Darby & Cushman
ATTORNEYS

PATENTED AUG 3 1971 3,597,646

SHEET 4 OF 4

INVENTOR
PETER JOHN LAWRENSON
BY Cushman Darby & Cushman
ATTORNEYS

DYNAMOELECTRIC MACHINES

This invention relates to reluctance machines or synchronous induction machines and is a continuation-in-part of U.S. Pat. application Ser. No. 633,103.

The reluctance machine is an electrical alternating current machine the stator of which has a multiphase or single-phase winding arranged to produce a rotating or pulsating magnetic field and the rotor of which is unenergized and is provided with axially extending conductors connected at their ends to circumferential rings in similar manner to the squirrel cage of an induction motor. The rotor has magnetic material arranged anisotropically so that when it is in one particular position relative to the magnetic field, termed the direct axis position, it presents the minimum reluctance to the stator magnetic field while when it is 90 electrical degrees from this position, termed the quadrature axis position, it present the maximum reluctance to the stator magnetic field. The rotor starts and accelerates in a manner similar to the squirrel cage induction motor and the effect of the anisotropic arrangement of its magnetic material is to cause it to pull into synchronism with the rotating magnetic field with a maximum torque known as the pull-in torque which varies with the inertia of the load and thereafter to rotate at synchronous speed provided that the torque on the rotor does not exceed a certain value, known as the fullout torque. To optimize the values of these torques it is necessary firstly to optimize the ratio of the quadrature axis reluctance to the direct axis reluctance, and, secondly, to correctly distribute the conducting material of the rotor winding, both of these in accordance with the type of duty required of the motor.

Conventional reluctance motors have usually been designed with magnetic material in the form of salient poles. It is also known to split the salient poles by means of radial slots filled with conducting material. These slots act as flux barriers to quadrature axis flux without appreciably affecting the direct axis flux. More recent proposals are to remove material along a plurality of paths which extend parallel to the direction taken by the direct axis magnetic flux. The spaces where magnetic material has been removed act as guides to the direct axis flux but lie athwart the paths taken by quadrature axis flux and therefore act as barriers to the quadrature axis flux.

In all these arrangements it has been thought necessary to provide the maximum amounts of magnetic material in the regions of the direct axes, preferably by way of salient poles, in order to minimize the direct axis reluctance. It has also been thought necessary to provide the maximum amount of conducting material consistent with magnetic circuit considerations connected to form part of the squirrel cage in all places around the periphery and in the interior of the rotor where magnetic material has been removed.

However it has now been discovered that improved performance is obtained by discarding the idea of providing even vestiges of salient poles and instead magnetically isolated circumferential segments of magnetic material provide paths of direct axis flux between adjacent poles. The gaps between segments occur at the positions of the direct axes where it has hitherto been generally thought desirable to provide magnetic material. However it will be realized that the path for quadrature axis flux passes between adjacent segments so that the quadrature axis reluctance is maximized. The consequent improvement in the balance between quadrature and direct axis reluctances more than offsets the effects of any slight increase in direct axis reluctance that may be brought about by the reduction of the amounts of magnetic material at the positions of the direct axes.

In addition by arranging that the electrically conductive material forming the squirrel cage is distributed in a somewhat similar manner to the anisotropic distribution of the magnetic material, namely by providing a minimum amount of conductive material in the vicinity of the direct axes and providing a maximum amount of conductive material along the positions of the quadrature axes very considerable improvement in performance is obtained, relating especially to the increased stability (with respect to speed oscillations particularly at low supply frequencies), the increased capacity of the machine to pull in high inertia loads and, in relation to its pull-in capacity, the low starting current. The problem of instability is possibly the principal one arising in the extremely important variable frequency systems in which it is now increasingly required to operate reluctance machines and the increase inherent in machine stability just referred to is of great value.

In the first place the required arrangement of conducting material may be provided by rearranging the distribution of the conductive bars forming the squirrel cage as by omitting bars, or spacing bars more widely, in the neighborhood, of the direct axis and providing extra bars, and spacing bars more closely together, in the neighborhood of the quadrature axis. Alternatively a uniform spacing between bar centers may be retained but wider bars may be used in the vicinity of the quadrature axis. Also additional conductive material may be located in channels positioned at the peripheries of the segments about the positions of the quadrature aces. Yet again, the slot shapes in the region of the direct axes may be so chosen as to reduce their leakage reactance and/or increase their resistance. In every case at least the vestiges of teeth are retained rather than simple channels since it is important to control particularly the leakage reactance of the rotor direct axis circuits and thus obtain the high degree of stability referred to together with high starting torque and low starting currents.

Further advantages are obtained by shaping the segments so that the gap between adjacent segments is wider at the root of the segments nearer the axis of the rotor than at the periphery of the rotor. To this end the segments may be provided with tips which extend circumferentially outwardly of the segments around the periphery of the rotor. In the design of reluctance machines embodying the invention the most significant parameter is "beta," the ratio of segment span to pole pitch. COnvenient values of beta are between 0.75 and 0.95 depending upon what form of winding rearrangement is provided. Generally if no channel is used the smaller values of "beta" are appropriate while if a channel is used the higher ones are, with an optimum of about 0.9.

Figure 7:
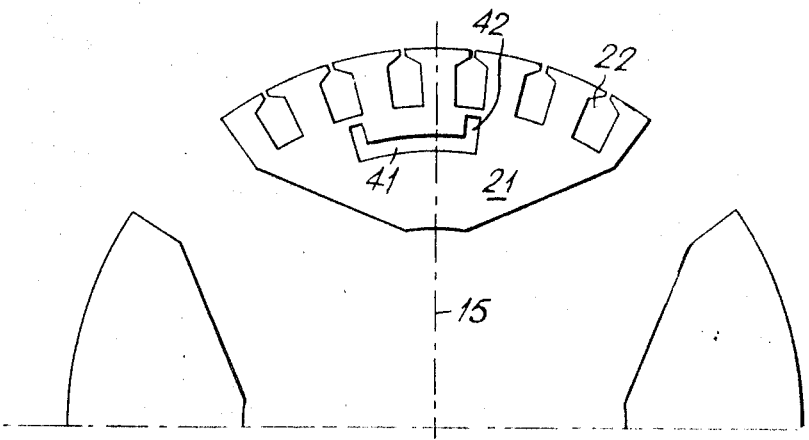
Figure 8:
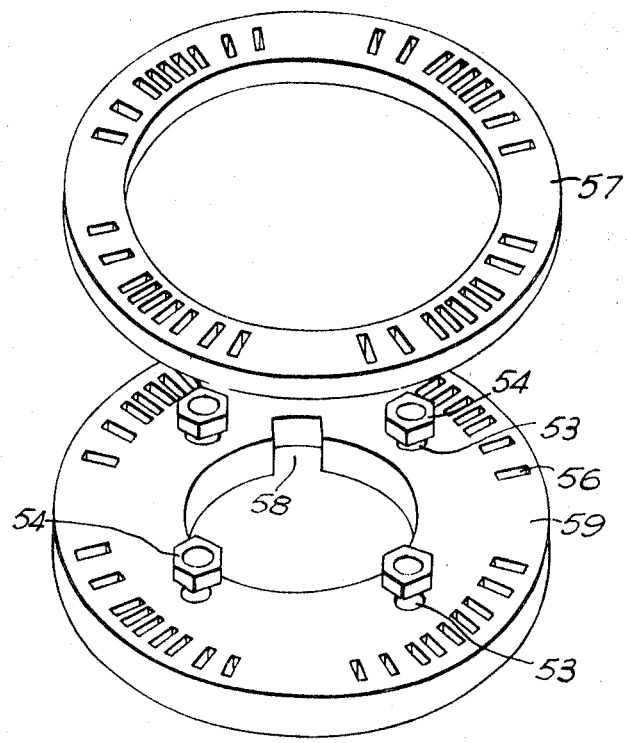
Figure 8:
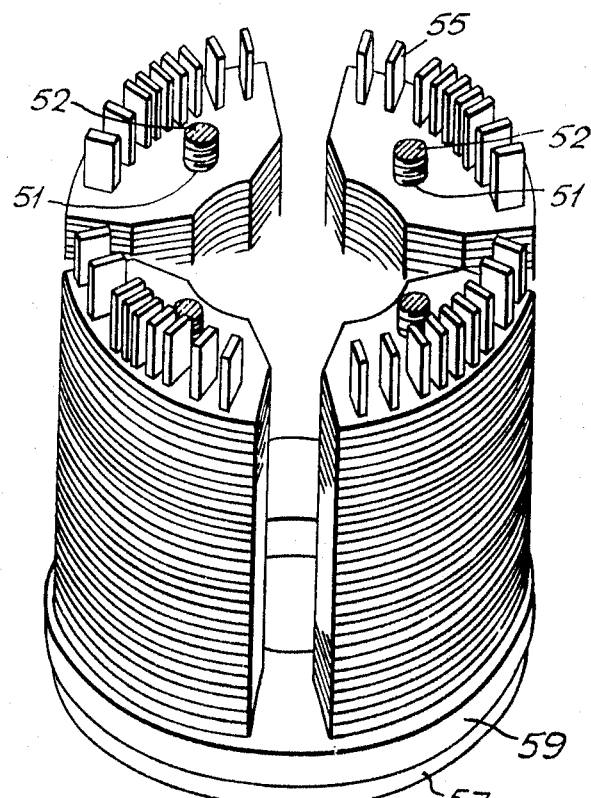

In order that the invention may be more fully understood reference will now be made to the accompanying drawings in which FIGS. 1 to 7 inclusive illustrate different profiles of magnetic stampings suitable for use in a reluctance motor embodying the invention and FIG. 8 illustrates an arrangement for constructing a rotor using any of the stampings illustrated in the previous figures.

Referring now to FIG. 1 there is shown therein a reluctance machine having a stator 1 of conventional construction and provided with a four-pole field distribution. The rotor 2 of the machine has no salient poles but is provided with four segments 3 of magnetic material. The segments are formed of stacks of laminations each having the shape illustrated in the sectional view of FIG. 1. The segments are magnetically isolated from each other and there is a large gap 4 between adjacent segments along the lines of the direct axes 7 of the rotor. In this gap 4 there is neither magnetic material nor conductive material. The segments 3 are provided with slots 5 through which bars 6 of electrically conductive material extend and which are connected at the ends of the rotor to end rings so as to form a squirrel cage.

The slots 5 are not evenly distributed round the circumference of the segments but are more close together in the neighborhoods of the quadrature axes 8 so that the center-to-center spacing of the bars is nonuniform. By this means the amount of conductive material in the region of the quadrature axes is a maximum and there is a minimum (in fact zero) amount of conductive material in the intersegmental gaps 4.

Figure 2:
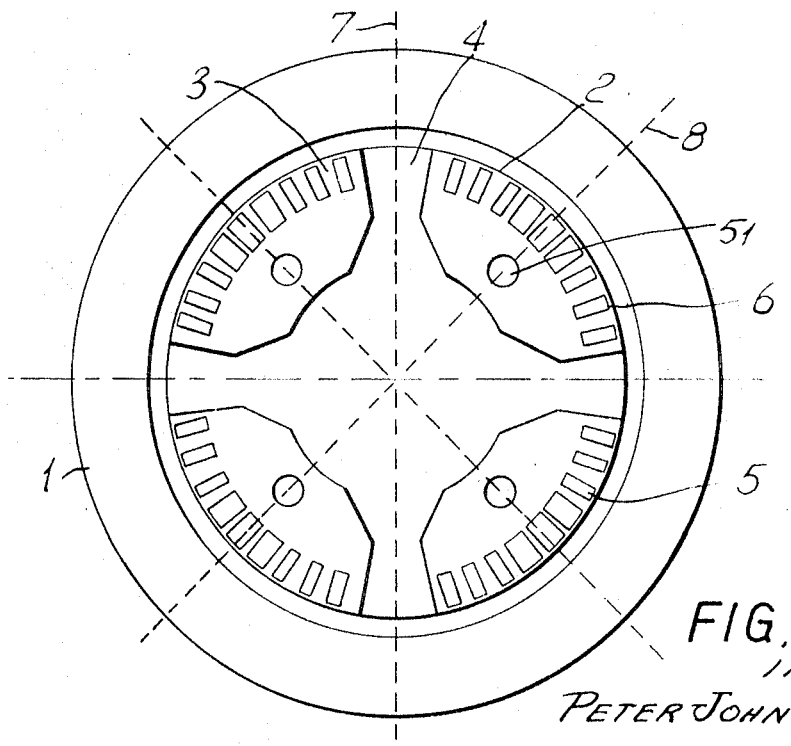

FIG. 2 illustrates an arrangement which is identical in most respects to FIG. 1 and the parts have like reference numerals. However instead of providing additional slots for squirrel cage bars in the region of the quadrature axes the same number of slots are provided but their width is increased. It will be understood that combinations of the arrangement of FIG. 1 and FIG. 2 can be provided, that is to say the amount of conductive material may be maximized in the region of the quadrature axis both by providing more slots and by increasing the width of such slots.

While no conductor bars have been illustrated as being provided in the intersegmental gaps, the advantages of the invention can still be obtained with some conductor material present in gaps 4.

Figure 3:
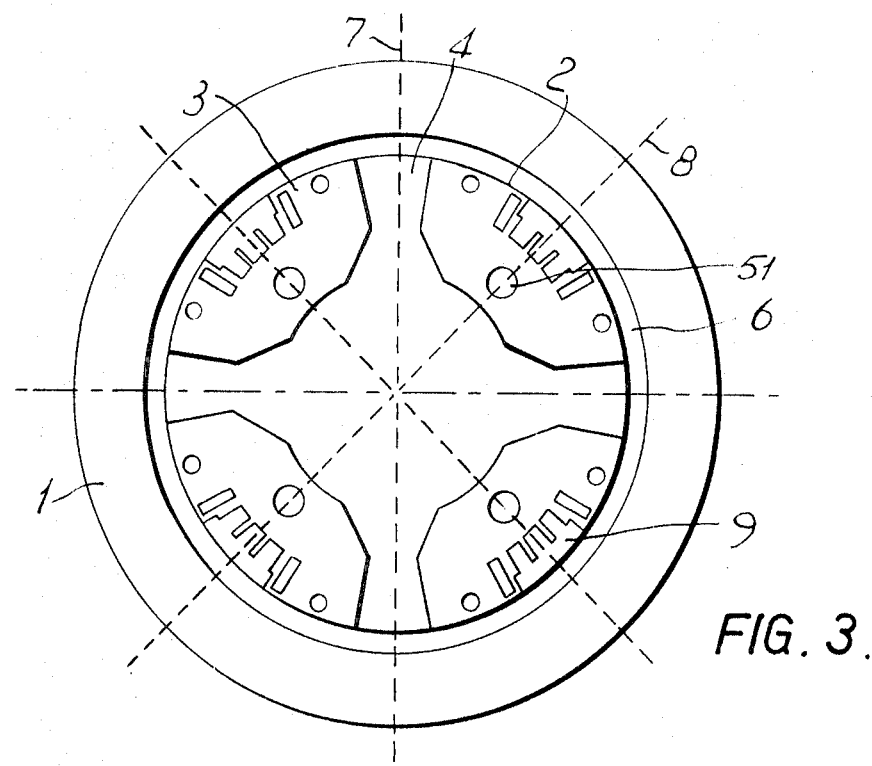

Referring now to FIG. 3 another arrangement is shown in which the amount of conductive material in the neighborhood of the quadrature axis is increased by providing wider slots as in FIG. 2 and in addition completely removing magnetic material over a shallow circumferential arc located centrally of the segments in their surface so that a solid mass of conductor is provided to fill both the slots 5 and the shallow channel 9 in the surface.

Figure 4:
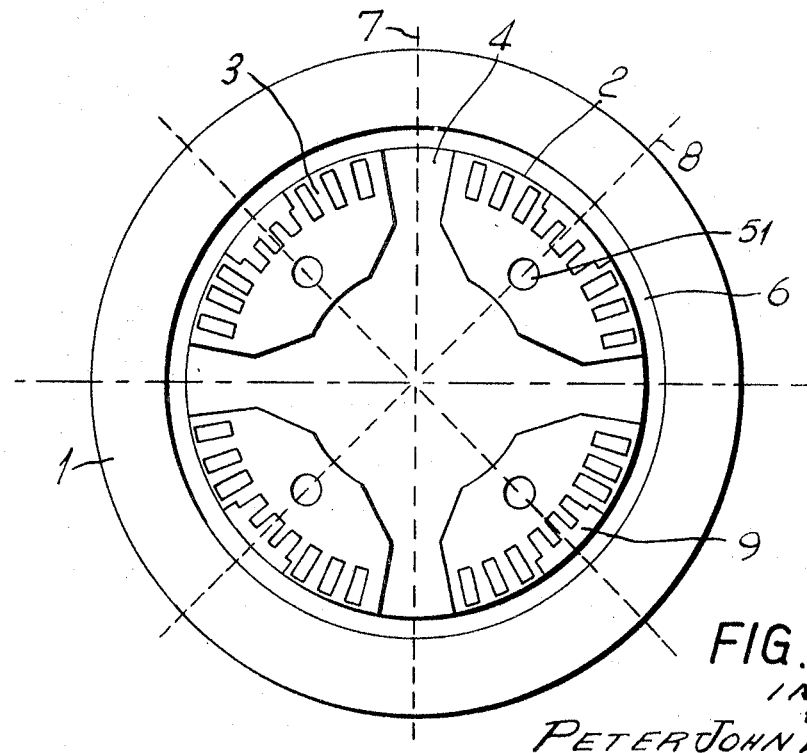

A similar arrangement is shown in FIG. 4 except that in this case the slots 5 are distributed evenly throughout the segments and the additional material is provided solely by filling the shallow channels 9 provided in the surface with conductive material.

FIG. 3 also illustrates a suitable shaping of the slots in that whereas deep rectangular slots are provided in the central regions of the segments, the slots have a smaller round cross section towards the ends of the segments and are spaced more widely apart.

It will be appreciated that the presence of conducting material has no effect when the rotor is running at synchronous speed since there is then no flow of current in the conducting material and the material then behaves no differently than if it were an airgap. However when the rotor is running at nonsynchronous speeds the effect of the current flow is to enhance the flux barrier effect of the conducting material. Thus the electrically conducting material in the neighborhood of the direct axes and in the guides of previous machines cause the ratio (direct axis reluctance/quadrature axis reluctance) to be higher under synchronous than under asynchronous conditions. Those skilled in the art will realize that this will have an adverse effect on the asynchronous performance, particularly pull-in, and accordingly it is a feature of this invention that the effective impedance of such conducting material is increased.

Another advantage of the distribution of the conducting material in the manner described herein is that the maximum current density now occurs in positions where it most readily reacts with the main flux in the rotor segments and hence is the best positions for producing torque. Furthermore the minimization of conducting material in the neighborhood of the direct axes, where it does not contribute to torque, prevents the quadrature axis resistance from becoming unnecessarily low and hence the stability poor and the starting current unnecessarily high for a given performance.

Since the conducting material in the neighborhood of the quadrature axes is contained in slots the direct axis leakage reactance of the rotor is increased giving better stability, higher starting torque and lower starting currents. Also the then sections of magnetic material between the slots in the neighborhood of the quadrature axes can saturate, thus still further improving the effectiveness of the flux barrier effect the quadrature axes. However as is desirable such saturation does not occur in the neighborhood of the direct axes where the sections between the slots are wider. High direct axis leakage reactance is obtained not only with the arrangements of FIG. 1 and FIG. 2, but also with the arrangements of FIG. 3 and FIG. 4 since in the latter arrangements the circumferential channels are shallow and at least part of the slots are maintained separate from each other so that the resulting leakage reactance of the rotor winding is greater than if the equivalent amount of conductive material were in channels only without the presences of at least vestigial slots depending from the channels.

Figure 5:
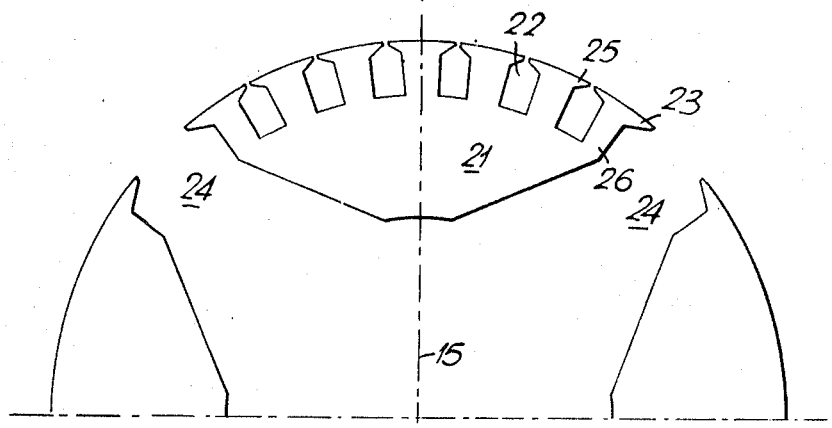

Another feature of the invention is illustrated in FIG. 5. A segment 21 of a rotor of a reluctance motor comprises a stamping of magnetic material having a plurality of winding slots 22 and tips 23 extending circumferentially on either side of the segment.

By providing tips 23 to the segments of the rotor separate control is provided for the widths of the main parts of gaps 24 between adjacent segments and the widths between the segments at their peripheries. In designing a reluctance machine having a segmented rotor the principal design parameter is the ratio of segment span to pole pitch, normally designated as "beta," and hitherto once the value of beta has been fixed this in turn has determined the size of the gaps between the ends of adjacent segments. However the distance between the ends of the segments influences the flux leakage between them and it is therefore desireable to have separate control of this parameter and of beta. This is achieved by providing the tips 23. In general the tips should have radial depths such as to prevent excessive saturation due to the flux gathered within their circumferential lengths. Typically this implies proportions similar to those of the tips 25 of the teeth bounding the slots 22. With the arrangement shown in FIG. 5 the value of beta can be increased compared with previously used values and the size of the intersegmental gap 24 is maximized consistent with avoiding saturation in the end teeth 26 of the segments. In practice it will frequently be found that separate designing of the tip 23 is not necessary since the same profile as used for the slot tips 25 can be used for these tips.

The arrangement illustrated in FIG. 5 is particularly valuable in giving increased freedom in the design of the magnetic circuit when used with deep bar or double cage windings because such windings are themselves advantageous from several points of view. It may also be advantageous in certain circumstances to provide tips 23 on some but not all of the segments. Alternatively or in addition tips may be provided at one side of a segment only and not the other side. Also tips can be of different proportions in different segments.

Figure 6:
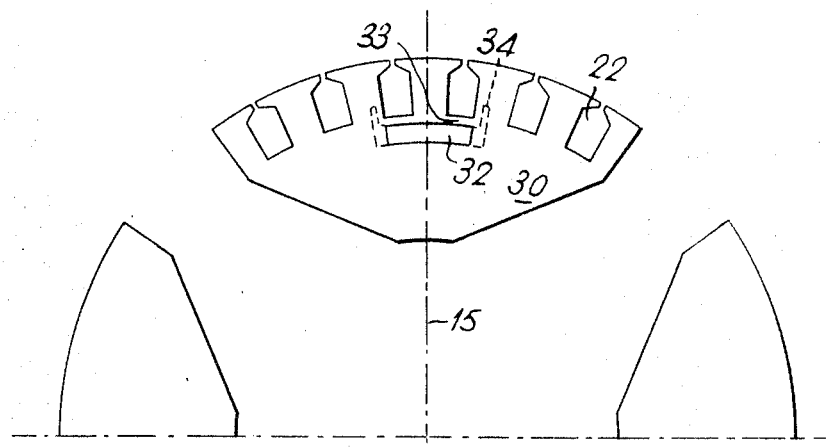

FIG. 6 illustrates another feature of the invention. A reluctance motor has a rotor comprising a plurality of segments 30 formed of magnetic stampings and a stator, which is not shown, having a single-phase or multiphase AC winding. Segment 30 has a plurality of winding slots 22 formed around its periphery in which conductor bars are placed which are connected to end rings. Immediately beneath the winding slots 22 over the central region of the segment there is provided a hole 32 extending through the segment and the width of the strip 33 of material between the bottom of the slots 22 and the holes 32 is made very small so that the passage of magnetic flux therethrough causes saturation and the consequent reluctance of the hole 32 in combination with strap 33 is high. The effect of such high reluctance immediately beneath the winding slots 22 has an effect very similar to that of a channel in the periphery of the rotor insofar as quadrature axis reluctance is concerned. However, this arrangement has two important advantages over peripheral channels. Firstly, it means that the squirrel cage winding is retained everywhere in the slots, the profiles of which can be controlled and with them the most favorable ratios of winding resistance and reactance. As a consequence the important asynchronous and stability characteristics of the machine are more easily controlled than when large slabs of conducting material are placed in channels at the periphery. Secondly, steps or edges in the magnetic material are not provided in the airgap surface where they have disadvantageous effects, for example in accentuating variation in torque with position at standstill and in harmonic torques during runup.

The hole 32 illustrated in FIG. 6 may have various alternative shapes to that illustrated designed to increase the reluctance in the strip 33 between the hole 32 and the slots 31. Also certain shapes of hole are more convenient for manufacture. One modification is to extend the sides of the hole 32 by the addition of end regions 34 extending radially outwardly. These end regions may be limited to some stampings only. The holes can be filled with conducting material. Furthermore, hole 32 need not be symmetrically placed relative to the centerline 15 of a segment but can be positioned to one side or the other thereof.

Different segments of the rotor such as the segment 21 illustrated in FIG. 5 and segment 30 in FIG. 6 can have different shapes. Thus a segment 21 is shown as having six slots while the other segments may have say five or seven slots. The angular spans of segments, whether with the same number of slots or with a different number, may be different in different parts of the rotor.

The segments illustrated in FIG. 5 and FIG. 6 are symmetrical about a central radial line 15. However the two halves of a segment need not be mirror images of each other but can be so shaped that are asymmetrical. Examples of such asymmetry are that the peripheries of segments in different halves do not lie at the same radius from the center of the motor so that the air gap between the rotor and the stator of the machine is different in different angular positions. Furthermore, where the segments are provided with central channels which may contain conductive material these channels may be offset relative to a centerline. Another example of asymmetry is in the provision of tips such as tips 23 at one end only of a segment, or where tips are provided at both ends, these may have different dimensions.

As illustrated in FIG. 7 flux guides 41 may be provided beneath the main winding slots, these guides being positioned nearer the center of the rotor than the holes 32 illustrated in FIG. 6 so that the strips of material between guides 41 and slots 31 do not become saturated. The guides 41 may have radially outwardly extending extension pieces 42 and may be offset to one side or the other as shown or they may be placed centrally of a segment.

All the above arrangements in which either the segments themselves are asymmetrical or different segments have different shapes allow for improved performance in that the smoothness of the torque is increased particularly in the standstill and runup conditions. Also correct use of asymmetry permits control of the magnetostatic potential of the rotor to improve the synchronous performance, for example the pullout power, power factor and efficiency.

It will be understood that any or all of the features described herein can be used either separately or together. Also it is not necessary that the number of segments in the rotor is equal to the number of poles for which the stator is wound but the number of segments can be less than the stator pole number. In particular the number of segments may be half the number of stator poles thus resulting in which has become known as a "simi-pole" machine. A rotor embodying the invention may be used with a stator wound to provide two or more alternative pole numbers.

FIG. 8 illustrates how stacks of magnetic stampings having one or other of the various profiles illustrated in FIG. 1 to 7 inclusive may be combined together to form a rotor of a reluctance motor. FIG. 8 is an exploded perspective view of a rotor constructed of four stacks of segments. All of the stampings have holes 51 through which axial bolts 52 extend and these bolts pass through matching holes 53 in nonmagnetic stainless steel end plates 59 after which they are secured by nuts 54 so that the set of four stacks of stampings are firmly held between end plates 59. The conductor bars 55 of the squirrel cage winding pass through the slots in the stacks of stampings and matching slots 56 in the end plates and are brazed at their ends to the copper end rings 57 of the squirrel cage windings. Keyways are provided on the end plates 59 and may be provided in the stacks of segments to secure the structure on a central shaft.

As an alternative to the arrangement for constructing the rotor illustrated in FIG. 8 any other convenient arrangement may be used. For example, the stacks of stampings may be directly keyed to a central shaft. Diecasting techniques may be used in manufacture possibly with auxiliary machining operations to remove magnetic material.

I claim

1. A dynamoelectric machine of the reluctance type having a rotor comprising a plurality of circumferentially extending segments of magnetic material magnetically isolated from each other by intersegmental gaps, said segments having slots for a squirrel cage winding, and electrically conductive material in the form of bars lying in said slots and end rings connected to said bars wherein the bars are so shaped and positioned that the cross section of conductive material per unit are decreases from a maximum in the central regions of the segments to a minimum in the vicinity of the ends of the segments and no bars are positioned in the intersegmental gaps.

2. The machine as claimed in claim 14 in which the center-to-center spacing between bars is nonuniform and the bars are closer together in the central regions of the segments than elsewhere in the segments.

3. The machine as claimed in claim 14 in which the center-to-center spacing of the bars is uniform and the bars in the central regions of the segments have a greater cross section than elsewhere in the segments.

4. The machine as claimed in claim 14 in which shallow peripheral channels filled with conductive material are provided in the central regions of the segments and vestigial slots depend from said channels.

5. The machine as claimed in claim 14 in which at least some of the segments have at least one end tip which extends circumferentially outwardly around the periphery of the rotor.

6. The machine as claimed in claim 5 in which, the segments are shaped to provide tips for the teeth of the winding slots and in which the said end tips have similar shapes to the tips of the teeth.

7. The machine as claimed in claim 14 in which different segments have different shapes to each other.

8. The machine as claimed in claim 7 in which alternate segments have different numbers of winding slots.

9. The machine as claimed in claim 7 in which different segments have different spans to each other.

10. The machine as claimed in claim 14 in which holes are provided in the segments positioned close to the bases of the winding slots so that the magnetic material between the holes and the slots saturates and together with the holes and winding slots act to constitute a barrier for magnetic flux along the quadrature axes.

11. The machine as claimed in claim 14 in which flux guides are provided positioned and shaped so as to maintain low reluctance paths for flux in a circumferential direction and to constitute nonmagnetic barriers for quadrature axis flux.

12. The machine as claimed in claim 11 in which the flux guides comprise closed circumferentially extending slots positioned beneath the main winding slots and extending in a direction generally parallel to the circumference of the rotor.